US011316680B2

(12) United States Patent
Robison et al.

(10) Patent No.: US 11,316,680 B2
(45) Date of Patent: Apr. 26, 2022

(54) PROTECTED CREDENTIALS FOR ROAMING BIOMETRIC LOGIN PROFILES

(71) Applicant: Dell Products, L.P., Round Rock, TX (US)

(72) Inventors: Charles D. Robison, Buford, GA (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 303 days.

(21) Appl. No.: 16/282,070

(22) Filed: Feb. 21, 2019

(65) Prior Publication Data

US 2020/0274705 A1    Aug. 27, 2020

(51) Int. Cl.
   *G06F 21/00*    (2013.01)
   *H04L 9/08*     (2006.01)
   *H04L 29/06*    (2006.01)

(52) U.S. Cl.
   CPC ........ *H04L 9/0866* (2013.01); *H04L 63/0428* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 6,045,039 A * | 4/2000 | Stinson | ........... | G06Q 20/18 235/379 |
| 9,465,818 B2 * | 10/2016 | Kerr | ........... | G06F 16/51 |
| 10,810,294 B2 * | 10/2020 | Yim | ........... | G06F 21/32 |
| 2010/0027045 A1 * | 2/2010 | Moore | ........... | G06F 21/32 358/1.14 |
| 2013/0076482 A1 * | 3/2013 | Wan | ........... | G07C 9/257 340/5.3 |
| 2013/0152180 A1 * | 6/2013 | Nair | ........... | H04L 63/0823 726/6 |
| 2016/0164867 A1 * | 6/2016 | Jung | ........... | H04W 4/80 713/186 |
| 2016/0364559 A1 * | 12/2016 | Bali | ........... | H04L 9/0866 |
| 2018/0219680 A1 * | 8/2018 | Kamal | ........... | H04L 9/3231 |
| 2019/0044723 A1 * | 2/2019 | Prakash | ........... | G06K 9/00255 |
| 2019/0243956 A1 * | 8/2019 | Sheets | ........... | G06F 16/903 |
| 2021/0012008 A1 * | 1/2021 | Kim | ........... | G06F 21/572 |

\* cited by examiner

*Primary Examiner* — Alexander Lagor
(74) *Attorney, Agent, or Firm* — Fogarty LLP (57) ABSTRACT

In a system of networked IHSs (Information Handling Systems) supporting the use of roaming biometric profiles, an individual may utilize biometric authentication for gaining access to various IHSs within the system. An IHS configured to support roaming biometric authentication includes biometric sensors that support secure transmission and management of biometric prints collected by such sensors. Such biometric sensors may interoperate with a secure processing component of the IHS in order to prevent transmission and storage of unprotected biometric prints, while still supporting roaming biometric authentication. The biometric sensor utilizes an encryption key for encoding biometric prints where the key is selected based on a group affiliation of the individual, thus protecting biometric prints from other groups that use roaming biometric authentication while sharing the same network of IHSs.

15 Claims, 4 Drawing Sheets

PROTECTED CREDENTIALS FOR ROAMING BIOMETRIC LOGIN PROFILES

FIELD

This disclosure relates generally to Information Handling Systems (IHSs) and, more specifically, to biometric access control profiles for IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Various authentication requirements may be enforced in order to restrict access to an IHS, or access to certain resources available via an IHS. Biometric identification is becoming a widely adopted technique for authenticating an individual that is requesting access to an IHS, or an IHS resource. In biometric identification techniques, an individual provides a biometric print, such as a fingerprint, facial scan or voice sample, that can be used to authenticate the identity of the individual. Such forms of biometric authentication provide a mechanism for uniquely identifying an individual while improving on the security offered by existing techniques, such as the use of passwords and smartcards that can be exchanged or stolen with relative ease. However, one challenge associated with biometric identifications is a susceptibility to spoofing. If a biometric print is captured by a malicious actor, the captured biometric print may be presented in replay attacks that seek to gain access to protected resources by impersonating an authorized individual. The risk of such replay attacks is pronounced in scenarios where roaming biometric authentication systems allow individuals to provide biometric credentials for gaining access to any IHS within a network of IHSs. Such networks of IHSs may include data management systems, such as medical and law enforcement systems, that may include a large number of endpoint IHSs and many individuals that may be authorized to access all or some of these endpoints.

SUMMARY

In various embodiments, a method provides roaming biometric authentication of users requesting access to an Information Handling System (IHS) or a resource available via the IHS. The method includes: receiving a request to collect a biometric print for authentication of a first user of the IHS; collecting, by a biometric sensor of the IHS, the biometric print from the first user; retrieving, by the biometric sensor, a biometric key associated with a group affiliation of the first user; encrypting, by the biometric sensor, the collected biometric print using the biometric key; and transmitting the encrypted biometric print to an authentication system for matching the biometric print against a library of stored biometric templates.

In additional method embodiments, the biometric key associated with the group affiliation of the first user is retrieved from a secure storage of the biometric sensor. In additional method embodiments, the biometric key associated with the group affiliation of the first user is retrieved from a secure storage of a secure processor of the IHS. In additional method embodiments, the authentication system operates within a secure execution environment of the secure processor. In additional method embodiments, the biometric sensor is coupled to the secure processor via an out-of-band signal pathway that is not accessible via the operating system of the IHS. In additional method embodiments, the authentication system attempts to match the biometric print against a library of locally stored biometric templates and wherein the authentication system transmits the encrypted biometric print to a remote authentication service if the biometric print cannot be matched locally. In additional method embodiments, instructions utilized by the biometric sensor are authenticated upon initialization of the biometric sensor. In additional method embodiments, the biometric sensor instructions are authenticated based on a reference signature of instructions provided for the biometric sensor during assembly of the IHS.

In various additional embodiments, an Information Handling System (IHS) supports roaming biometric authentication of users of the IHS resource available via the IHS. The IHS includes: a biometric sensor comprising a logic unit and a secured memory, wherein the biometric sensor is operable for collecting biometric prints, and wherein the logic unit of the biometric sensor is configured to: receive a request to collect a biometric print for authentication of a first user of the IHS; collect the biometric print from the first user; retrieve a biometric key associated with a group affiliation of the first user; encrypt the collected biometric print using the biometric key; and transmit the encrypted biometric print to an authentication system; and the authentication system configured to: decrypt the biometric print received from the biometric sensor; and match the biometric print against a library of stored biometric templates.

In additional IHS embodiments, the biometric key associated with the group affiliation of the first user is retrieved from the secured memory of the biometric sensor. In additional IHS embodiments, the biometric key associated with the group affiliation of the first user is retrieved from a secure storage of a secure processor of the IHS. In additional IHS embodiments, the authentication system operates within a secure execution environment of a secure processor of the IHS. In additional IHS embodiments, the biometric sensor is coupled to the secure processor via an out-of-band signal pathway that is not accessible via the operating system of the IHS. In additional IHS embodiments, the authentication system attempts to match the biometric print against a library of locally stored biometric templates and wherein the authentication system transmits the encrypted biometric print to a remote authentication service if the biometric print cannot be matched locally. In additional IHS embodiments, instructions utilized by the biometric sensor are authenticated by the secure processor upon initialization of the biometric sensor based on a reference signature of biometric sensor instructions provided during the IHS assembly.

In various additional embodiments, a system provides roaming biometric authentication. The system includes a plurality of Information Handling Systems (IHSs) operable for providing biometric authentication of a plurality of users of the system, wherein each IHS includes a biometric sensor comprising a logic unit and a secured memory. The biometric sensor is operable for collecting biometric prints, and wherein the logic unit of the biometric sensor is configured to: receive a request to collect a biometric print for authentication of a first user; collect the biometric print from the first user; retrieve a biometric key associated with a group affiliation of the first user; encrypt the collected biometric print using the biometric key; and transmit the encrypted biometric print to an authentication system; and a secure processor, wherein the authentication system operates within a secure execution environment of the secure processor and wherein the authentication system is configured to: decrypt the biometric print received from the biometric sensor; and match the biometric print against a library of stored biometric templates.

In additional system embodiments, the biometric key associated with the group affiliation of the first user is retrieved from the secured memory of the biometric sensor. In additional system embodiments, the biometric key associated with the group affiliation of the first user is retrieved from a secure storage of the secure processor. In additional system embodiments, the biometric sensor is coupled to the secure processor via an out-of-band signal pathway that is not accessible via the operating system of an IHS. In additional embodiments, the system also includes a remote authentication service, wherein the authentication system attempts to match the biometric print against a library of biometric templates stored in a secure storage of the secure processor and wherein the authentication system transmits the encrypted biometric print to the remote authentication service if the biometric print cannot be matched based on the biometric templates stored in the secure storage of the secure processor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
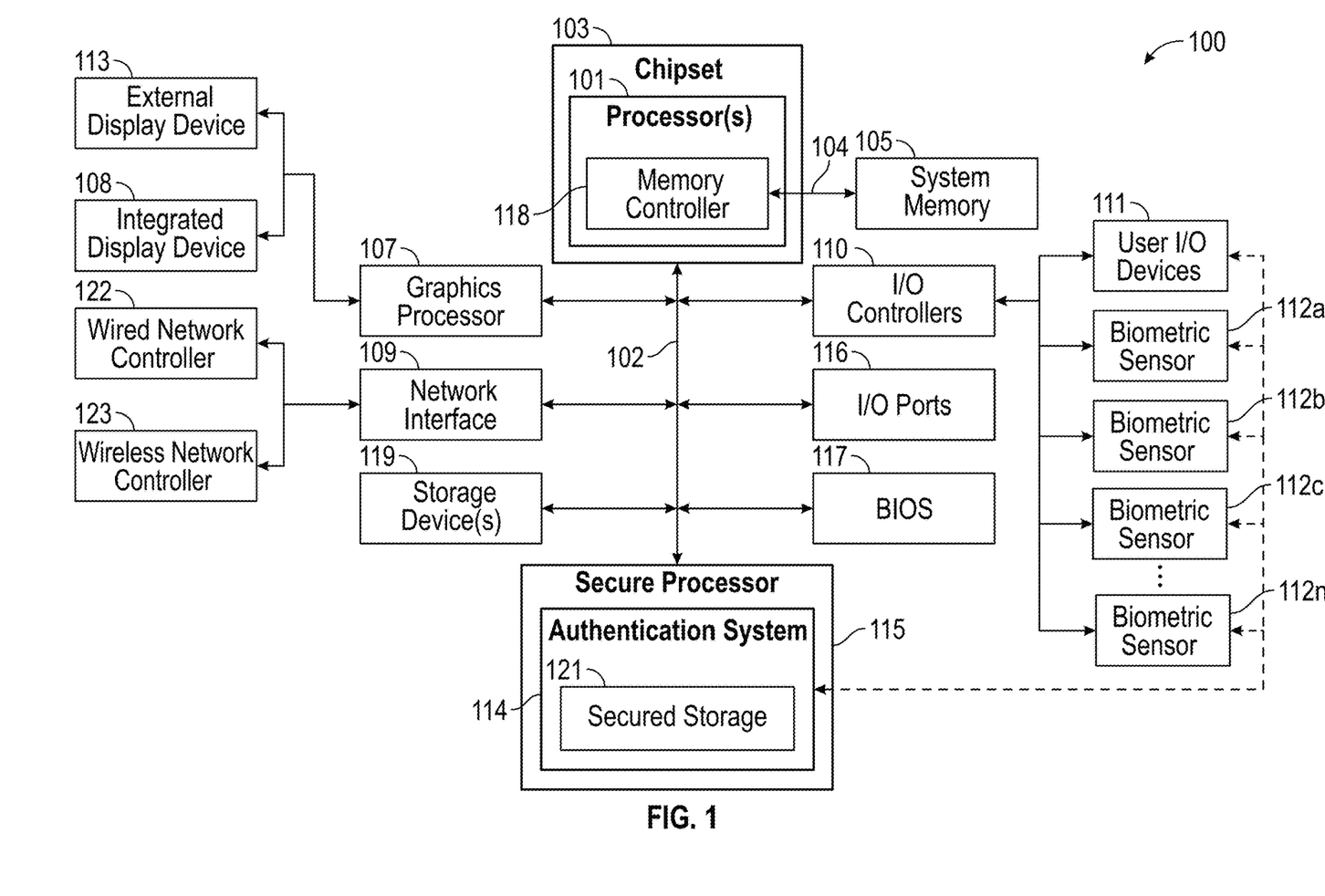
FIG. 1 is a block diagram depicting certain components of an IHS configured according to various embodiments for management of roaming profiles for biometric access control.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, in certain scenarios, access to an IHS, or a resource available via an IHS, may be granted to an individual based on authentication of biometric indicators collected from the individual. Such biometric authentications may be conducted based on biometric prints that may include fingerprints, facial scans and voice prints collected by biometric sensors. In a system of networked IHSs supporting roaming biometric profiles, an individual may utilize biometric authentication for gaining access to various IHSs within the system. As described in additional detail with regard to the below embodiments, an individual IHS configured to support roaming biometric profiles within such a system may include biometric sensors that support secure transmission and management of biometric prints collected by such sensors. As described, such biometric sensors may interoperate with a secure processing component of the IHS in order to prevent transmission or storage of unprotected biometric prints, while still supporting roaming biometric authentication.

FIG. 1 is a block diagram illustrating certain components of an IHS 100 configured according to certain embodiments management of roaming profiles for biometric access control. In various embodiments, IHS 100 may include a secure processor 115 that executes program instructions that cause the secure processor 115 to perform certain of the operations disclosed herein. While a single IHS 100 is illustrated in FIG. 1, IHS 100 may be a component of an enterprise datacenter system that may include any number of additional IHSs that may also be configured as participant nodes in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

In certain embodiments, I/O controllers 110 may provide access to one or more biometric sensors 112a-n. For instance, one or more I/O controllers 110 may provide access to fingerprint sensors, camera sensors that may operate at various wavelengths in order to capture facial scan and microphone sensors that may capture audio samples. As described in additional detail with regard to FIG. 2, each of the biometric sensors 112a-n may include logic units that execute firmware that implements secure transmission and storage of collected biometric prints in support of roaming biometric authentication that supports various different users providing biometric inputs via biometric sensors 112a-n in order to gain access to IHS 100, or to a protected resource of IHS 100, such as a protected data repository maintained on a storage device 119 or to enable a resource such as an I/O port 116 that enables a user to download information from IHS 100.

Other components of IHS 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 115, in order to establish a hardware root of trust in the trusted component that may then be utilized to support certain secure operations in support of roaming biometric profiles, such as described with regard to FIGS. 2-4.

In various embodiments, a secure processor 115 may be a hardware component that has been validated as a trusted resource coupled to IHS 100 and that provides an isolated execution and memory environment for supporting secure operations. In certain embodiments, secure processor 115 may be a component of a system-on-chip that has been configured to implement operations for authentication of individuals requesting access to IHS 100 and/or to resources available via IHS 100. In certain embodiments, secure processor 115 may be a component of a removeable, daughter card that is coupled to the motherboard of IHS 100. In other embodiments, secure processor 115 may be an FPGA (Field Programmable Gate Array) that has been configured to implement the authentication operations, where the instructions utilized by the FPGA are validated using hardware instructions in order to assure the integrity of the described authentication operations performed by the FPGA. In certain embodiments, the secure processor 115 may an embedded controller that is a motherboard component of IHS 100, where the firmware instructions utilized by the embedded controller are validated using hardware instructions in order to assure the integrity of the described authentication operations performed by the embedded controller.

In the illustrated embodiment, secure processor 115 implements the described authentication operations utilizing an authentication system 114 that, in certain embodiments, may be a component of a secure execution environment that is executed by the secure processor 115 based on instructions stored in a secured storage 121. Via functions provided by the secure execution environment, the authentication system 114 may receive requests to authenticate an individual seeking permission to access IHS 100 and/or a resource available via IHS 100. In certain embodiments, the authentication system 114 may utilize out-of-band couplings to each of the biometric sensors 112a-n that are supported by IHS 100.

Figure 2:
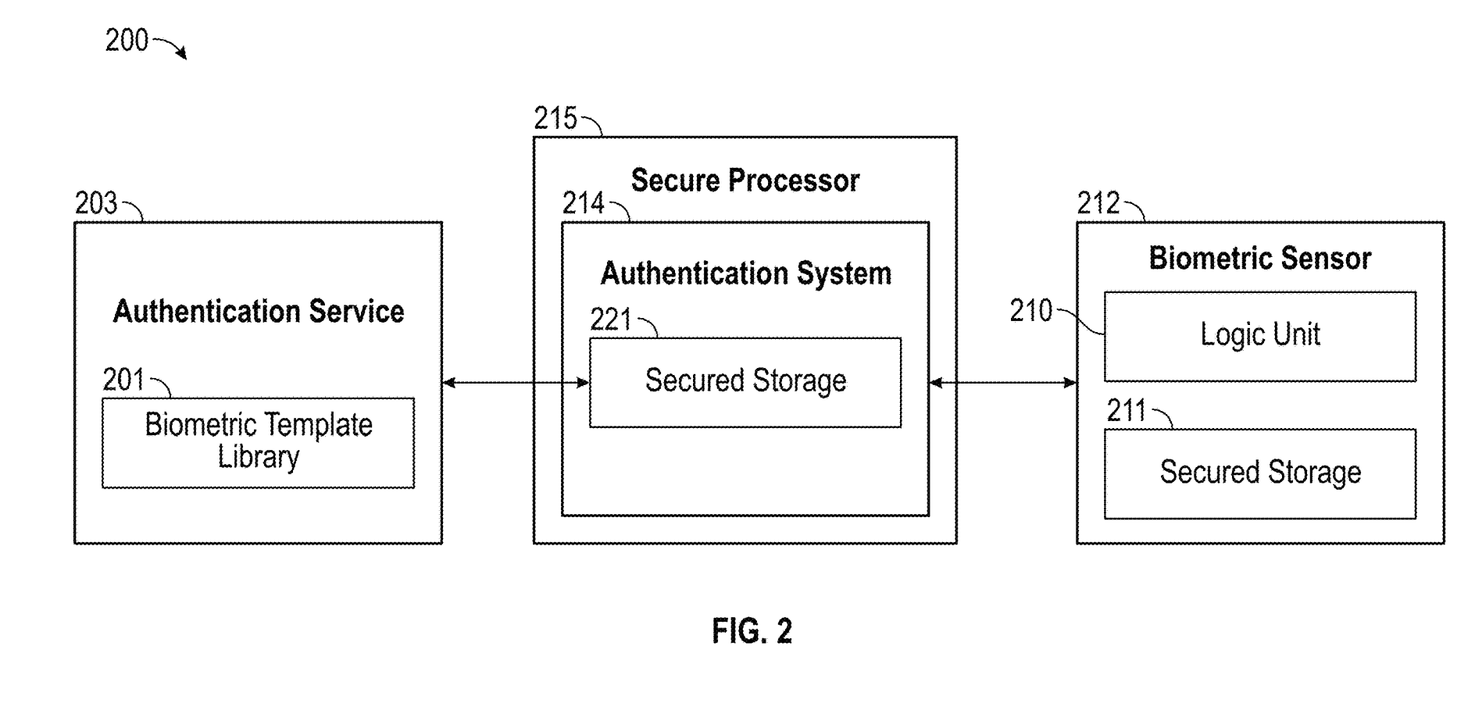
FIG. 2 is a block diagram depicting certain components of a system configured according to various embodiments for management of roaming profiles for biometric access control.

As described in additional detail with regard to FIG. 2, the authentication system 114 may utilize a logic unit and a secured storage 121 that are components of secure processor 115 and are isolated from the remaining components of IHS 100, such that authentication system 114 provides a mechanism for secure authentication of users that is independent from the operating system utilized by IHS 100. In certain embodiments, authentication system 114 may be configured to interoperate with a biometric authentication system supported by the operating system of IHS 100. For instance, authentication system 114 may be configured to receive authentication requests from the windows biometric framework (WBF) that is available via IHSs that run a WINDOWS operating system. Biometric authentication systems such as WBF may provide access to biometric sensors, storage of biometric templates and protocols for biometric template matching. In certain instances, such biometric authentication systems may also support various protocols for encoding biometric prints, but may also support transmission and storage of raw biometric prints. As described, use of unprotected biometric prints may be vulnerable to capture and misuse in replay attacks.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

FIG. 2 is a block diagram depicting certain components of a system 200 that may be configured for management of roaming profiles for biometric access control. As described with regard to FIG. 1, an IHS may include a secure processor 215 that may operate a secure execution environment that is external to the operating system of the IHS, including the use of a separate, secured memory device by the secure processor 215. In certain embodiments, the instructions utilized by secure processor 215 in operating the secure execution environment, and the authentication system 214, may be validated upon initialization of the secure processor 215 such that the integrity of the instructions may be confirmed.

In certain embodiments, the secure execution environment of secure processor 215 may include an authentication system 214 that may support various aspects of user authentication for an IHS. In particular, authentication system 214 may support various aspects of biometric authentication. As described, in certain embodiments, the operating system of an IHS may support biometric applications via an integrated authentication framework, such as WBF, that interfaces with biometric sensors and supports management and evaluation of biometric prints. In certain embodiments, an authentication framework supported by the operating system may be adapted to interface with secure processor 215 in the secure management and evaluation of biometric prints collected by the biometric sensors supported by the IHS.

In embodiments utilizing secure processor 215 in support of biometric authentication, the authentication system 214 may utilize a secure storage 221 that is accessible only by the secure processor 215 and is not accessible by any other components or processes of the IHS. In certain embodiments, secure storage 221 may be provisioned during manufacture of the IHS to store public and/or private keys to be used by biometric sensors 212 of the IHS in encoding collected biometric prints. For instance, secure storage 211 may maintain one or more public keys for use in encoding biometric prints collected by biometric sensors 212 of the IHS. In certain embodiments, secure storage 211 may maintain public keys for various organizations or other groups of users that are authorized to utilize the roaming biometric authentication system. In such embodiments, each organization or other group that is subject to distinct security protocols may be assigned a unique public and private key pair for use in encoding biometric prints subject to a particular security protocol.

In embodiments in which public keys are maintained by the authentication system 214 of the secure processor 215, the biometric sensors 212 supported by an IHS may rely on the authentication system 214 to provide the correct public key for encoding a collected biometric print from a particular individual. For instance, the roaming login request made by an individual may specify an organization or group affiliation of the individual. Based on the group specified in an access request, the authentication system 215 may determine the correct public key associated with the group. In certain embodiments, the authentication system 215 may be configured to provide the biometric sensor 212 with the public key to be used by the biometric sensor 212 to encode a request to collect a biometric print. In certain embodiments, the authentication system 215 may receive notification of an authentication request from an application of the operating system that supports biometric authentication and receives the authentication request, such as a WBF adapter. In such embodiments, the notification may specify the biometric sensor to be used in collecting a sample and a group associated with the individual. In certain embodiments, such notifications may also specify a purported identity of the individual, in which case the biometric authentication will confirm or disprove this purported identity of the individual. The authentication system 215 may determine the appropriate key for an authentication request based on such notifications and may transmit the appropriate key to the biometric sensor.

As illustrated, a biometric sensor 212 may include a logic unit 210 and a secured memory. In various embodiments, the logic unit 210 of a biometric sensor may be implemented using a microcontroller, embedded controller, system-on-chip or an FPGA. As described with regard to FIG. 1, in certain embodiments, the secure processor 215 may be configured to validate the integrity of the firmware instructions utilized by logic unit 210 upon initialization of sensor 212. In certain embodiment, the secure processor 215 may validate the firmware instructions stored within a secured storage 211 of the biometric sensor 212 by calculating a signature based on the firmware instructions and comparing them to a reference signature generated based on the firmware instructions with which the biometric sensor 212 was configured during manufacture of the IHS.

In certain embodiments, a logic unit of each biometric sensor 212 may provide the capability to encode collected biometric prints using a public key. In certain embodiments, the biometric sensor 212 may use a public key of a key pair for encrypting collected biometric prints, where the public key is selected based on an organization or group associated with the individual providing the biometric print. In this manner, each supported group may utilize distinct biometric authentication protocols in which biometric prints from each group can only be used within the authentication protocol for that specific group. Different groups may utilize roaming biometric authentication using shared IHSs while maintaining privacy of biometric prints from all other groups, thus providing security against external malicious actors, but also from other groups. As described, in certain embodiments, the public key for use in encoding a collected biometric print may be provided by the secure processor 215.

In other embodiments, the biometric sensor 212 may utilize instructions executed by the logic unit 210 to determine the public key associated with a collection request. In such embodiments, the biometric sensor 212 may utilize a private secure storage 211 to store all or a portion of the biometric keys that are supported by the roaming biometric authentication system. In such embodiments, the private secure storage 211 of biometric sensor may store public keys associated with certain user groups. In certain embodiments, each biometric sensor may be assigned an additional key pair that is unique for each biometric sensor and where the key pair assignment is made during manufacture of the IHS as part of the installation and configuration of the biometric sensor. In certain embodiments, each biometric sensor encoded with a unique public key during manufacture of the IHS in this manner may use this public key to digitally sign all communications transmitted by the biometric sensor. Components of the roaming biometric authentication system embodiments that have access to the private key necessary to decode the encrypted biometric prints would also have access to the private key necessary to confirm the authenticity of the digital signature by the biometric sensor. In this manner, biometric prints may be encoded and protected from use in replay attacks and the authenticity of biometric sensor transmissions may also be verified, thus providing additional assurance that a biometric sensor has not been compromised.

Once the public key for the organization of the user seeking biometric authentication has been identified, the biometric sensor 212 may signal an indication directing the user to provide the biometric sample, such as by illuminating an indicator light signaling a fingerprint sensor is activated and ready. The biometric sensor 212 may capture the biometric print as file, such as an image of a fingerprint, and may encrypt the collected print using the public key associated with the group of the purported user that is providing the biometric sample. In certain embodiments, the encrypted biometric print may be signed using a public key associated with the biometric sensor.

Once the biometric print is collected and encrypted, it may be transmitted in a secure manner for matching against biometric templates of authorized users. As illustrated, the biometric sensor 212 may transmit the encrypted biometric print to the authentication system 214 of the secure processor 215. Certain embodiments may utilize an out-of-band signaling pathway with the secure processor 215 to ensure secure transmission of the collected biometric prints. Other embodiments may transmit the encrypted biometric prints via a biometric authentication system of the operating system of the IHS, such as WBF in WINDOWS operation systems. In such embodiments, the encrypted biometric print may be transmitted, via a WBF application running in the operating system, to the secure processor 215, where the biometric print may be matched against locally stored templates in an attempt to authenticate the individual providing the biometric print.

As discussed, in certain scenarios, support for roaming biometric authentication will result in scenarios where the biometric template required for authenticating an individual is not available locally at the secure processor 215, or within a biometric system available via the operating system, of the IHS at which the individual is requesting authentication. In support of roaming biometric authentication in such scenarios, the authentication system 214 may offload certain biometric authentication operations to a remote authentication service 203 that maintains a biometric template library 201 that may include a biometric template for every authorized user of the roaming biometric authentication system. In order to authenticate received encrypted biometric prints, the remote authentication service 203 maintains the private keys associated with each key pair that has been authorized for use in the roaming biometric authentication system. Using the private key associated with the organization of the user providing the biometric print, the biometric print may be decrypted by the authentication service 203. In certain embodiments, the authenticity of a digital signature provided with the received print may be further verified using a private key associated with the particular biometric sensor capturing the print. If a received print is authenticated and a match is identified within the template library 201, a notification is forwarded to the authentication system 214 of the IHS, as well as to the roaming authentication application operating on the IHS.

In certain embodiments, authentication service 203 may be configured to detect the use of the same biometric print concurrently at different IHSs. For instance, authentication service 203 may receive an encrypted biometric print for authenticated access to a first IHS. The authentication service 203 may signal a potential comprise of a particular biometric sensor or an IHS if this same biometric print is presented at a second IHS that is not located in close proximity to the first IHS. In certain embodiments, even if the identical biometric prints are not presented at different IHSs, the authentication service 203 may similarly signal an attempt by one purported individual to gain access to different IHSs that are not in close proximity to each other.

Figure 3:
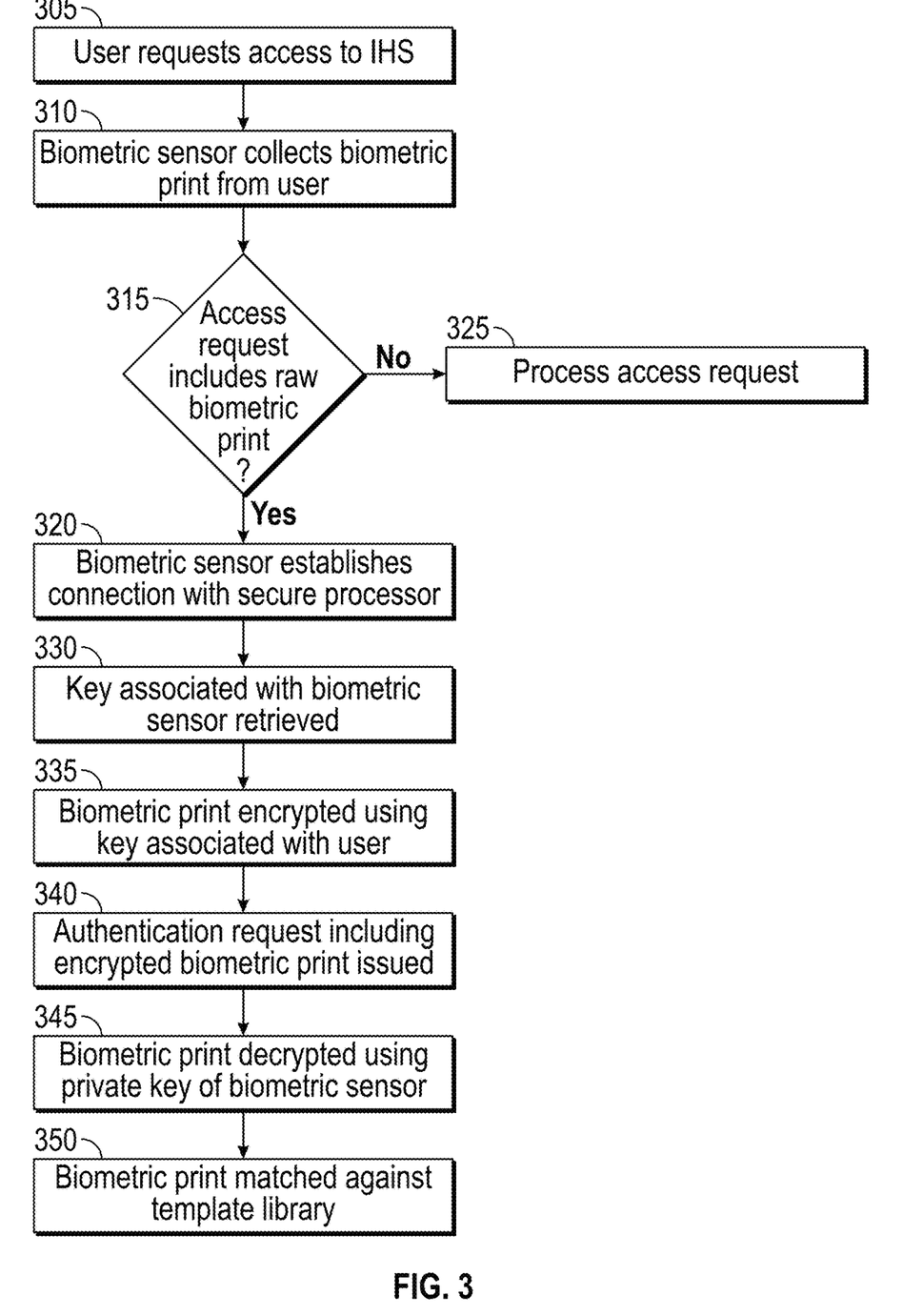
FIG. 3 is a flow chart illustrating certain steps of a process according to certain embodiments for management of roaming profiles for biometric access control.

FIG. 3 illustrates certain steps of a process according to certain embodiments for management of roaming profiles for biometric authorized access control. The illustrated embodiment begins at block 305 with an individual requesting access to an IHS, or a resource that is available via an IHS. For instance, an individual presented with a login screen by the operating system of an IHS, or by an authentication application supporting use of roaming biometric profiles, may select an option for biometric authentication in order to gain access to the IHS, or to the protected IHS resource. Upon detecting an indication that an individual is requesting biometric authentication, such as through a menu selection or via detection of the individual's finger placed on a fingerprint sensor, at block 310, a biometric sensor collects a biometric sample. For instance, if a finger is detected in contact with a capacitive fingerprint sensor, the fingerprint sensor may be activated and an image of the presented fingerprint may be captured. If voice print authentication has been selected, the IHS and/or roaming authentication application may prompt the individual to provide a voice sample. If facial recognition authentication has been selected, the IHS and/or roaming authentication application may prompt the individual to position themselves in proximity to a camera of the IHS.

Once a biometric sample has been collected from the requesting individual, in certain embodiments, the biometric sensor may be configured to perform an initial verification of the technical suitability of the collected biometric print for authenticating an individual. For instance, a fingerprint sensor may be configured to ensure that a minimum number of landmarks and/or features may be detected within a collected fingerprint image. Similarly, a voice print sensor may be configured to ensure that captured audio is sufficiently free of noise and includes a discernible voice from which a voice signature may be derived. A facial recognition sensor may be configured to confirm that a minimum set of facial features are discernible within a collected image of the individual's face.

In certain embodiments, a block 315, the biometric sensor collecting the biometric print may determine whether the authentication request received by the biometric sensor specifies a security protocol for protecting the collected biometric print. In existing authentication systems, biometric sensors may respond to such requests that do not specify a security protocol by transmitting raw biometric prints to the requesting authentication application. In roaming biometric authentication systems, such transmissions and storage of raw biometric prints results in increased risk the biometric prints will be misappropriated and misused. Accordingly, in certain instances, the authentication system may respond to any request that does not specify a security protocol, and is thus requesting use of raw biometric prints, by proceeding at block 320 to nonetheless provide secure transmission and storage of biometric prints. If a security protocol is specified in the authentication request, at block 325, the biometric sensor may encode the collected biometric print according to the applicable protocol and biometric authentication may proceed according to the applicable security protocol.

At block 320, the biometric sensor may initiate authentication of an individual by establishing a connection with a secure processor of the IHS, such as the secure processor 115 and 215 described with regard to FIGS. 1 and 2, respectively. In certain embodiments, biometric sensors supported by an IHS may communicate with a secure processor via an out-of-band communication pathway that is external to the operating system of the IHS. In other embodiments, biometric sensors may communicate with a secure processor via a secure communication protocol supported by the operating system of the IHS, such as a secure communication protocol supported between an authentication driver, such as provided by WBF, and the secure processor.

Upon establishing a connection with the secure processor, at block 330, a public encryption key may be retrieved from a secure storage of the secure processor. In certain embodiments, a public key may be selected based on the individual requesting the biometric authentication, and/or based on an organization with which the individual is associated. In certain embodiments, the roaming biometric authentication system may support distinct authentication protocols for different organizations or groups of users. For instance, in a law enforcement setting, certain devices may be operated both by law enforcement officials and by outside contractors. In such scenarios, separate authentication protocols may be implemented for law enforcement officials and for the outside contractors. For example, law enforcement officials may be granted full access to law enforcement devices upon successful login, while outside contracts may be limited to certain devices and may be limited with regard to the operations that may be performed and the data that may be accessed. In addition, outside contractor's use of the law enforcement system may be subject to additional auditing requirements. In support of such different uses of the same devices by different user groups, embodiments may support use of different biometric authentication protocols for the different user groups. Accordingly, a public key may be selected based on the organization specified by the individual requesting biometric authentication. In this manner, the biometric authentication protocols utilized by different organizations may be separately secured, even though individuals from the different organizations may use roaming biometric profiles on the same devices.

In other embodiments, a certain number of public keys may be maintained in a secures storage of the biometric sensor. In such embodiments, the biometric sensor may seek to identity that applicable public key locally and may query the secure processor as a secondary option. Once the applicable public key has been identified and retrieved, at block 335, the collected biometric print is encrypted using the public key. In certain embodiments, the collected biometric key may be encrypted by a logic unit of the biometric sensor, in which case the unprotected biometric print does not leave the biometric sensor. In other embodiments, the collected biometric print may be transmitted over a secure channel to the secure processor, where the biometric print may be encrypted. As described in regard to FIGS. 1 and 2, in certain embodiments, biometric sensors may be coupled to the secure processor via an out-of-band signal pathway that is external to the operating system of an IHS. Also as described, in other embodiments, biometric sensors may support secured communications with an authentication system such as WBF via in-band communication channels provided by the operating system of the IHS. For instance, in certain embodiments, the operating system may support secure communications with biometric sensors and with the secure processor, thus providing a protected channel for transmission of biometric prints and keys between the biometric sensors and the secure processor.

At block 340, the encrypted biometric print is utilized to issue an authentication request on behalf of the individual providing the biometric print. As described with respect to FIGS. 1 and 2, in certain embodiments, the secure processor may store certain biometric templates locally in a secure storage. For instance, the secure processor of an IHS may store biometric templates that correspond to the individuals that most frequently utilize the IHS. In such embodiments, at step 345, the secure processor may utilize a private encryption key corresponding to the organization or group of the requesting individual to decrypt the biometric print received from the biometric sensor. Within the secure execution environment of the secure processor, the decrypted biometric print may be matched, at block 350, against one or more of the locally stored biometric templates in order to attempt to authenticate the individual providing the collected biometric print.

As described, in a scenario supporting roaming biometric authentication, any authorized individual may access any IHS configured for participation in the roaming biometric authentication system. As such, in certain instances, an IHS that includes certain locally-stored templates may not have a locally-stored biometric template for every individual that requests access to the IHS or IHS resource. Accordingly, as described with regard to FIG. 2, in certain embodiments, the secure processor may establish a connection with a remote authentication service that has access to a complete set of biometric templates for all individuals that have been enrolled and authorized for use of the roaming biometric authentication system. In such embodiments, the encrypted biometric print is transmitted to the remote authentication service, which utilizes the private key corresponding to the organization of the requesting individual in order to decrypt the print. After decrypting the received biometric print, it may then be matched against the full library of biometric templates maintained by the remote biometric authentication service in order to attempt to authenticate the requesting individual.

Figure 4:
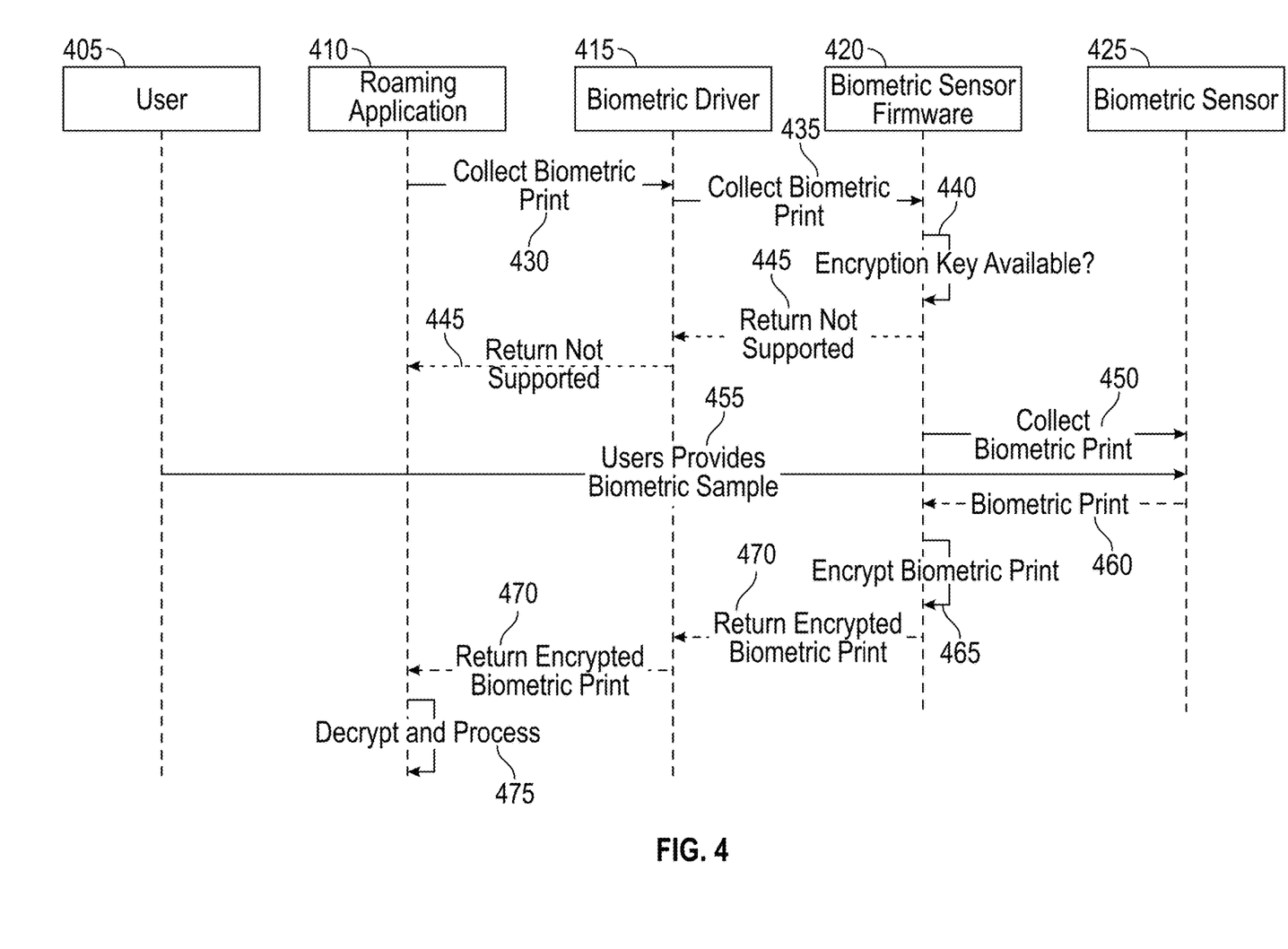
FIG. 4 is a swim lane diagram illustrating a distribution of operations, according to certain embodiments, within a system configured for management of roaming profiles for biometric access control.

FIG. 4 is a swim lane diagram illustrating a distribution of operations, according to certain embodiments, within a system configured for management of roaming profiles for biometric access control. In the embodiment of FIG. 4, a user 405 is requesting access to an IHS, or a resource available via an IHS. In certain instances, a user 405 may request such access through a login screen or other type of graphical interface selection. When requesting access to a resource available via IHS, a user 405 may make a graphical interface selection, such as launching a protected database that requires requesting individuals to provide biometric authentication of identity. In other instances, a user may request such access by activating a biometric sensor of the IHS, such as by placing a finger on a fingerprint sensor while the IHS is in standby mode waiting for a user to login.

In certain embodiments, the user's 405 request is received by a roaming authentication software application 410 of the IHS that supports roaming biometric authentication for various groups of individuals. In certain embodiments, each IHS participating in the roaming biometric authentication system executes a roaming authentication application 410 that may run as an application of the operating system of the IHS. In other embodiments, the roaming authentication application 410 may run as application of a secure execution environment of a secure processor of the IHS. The roaming application 410 may be invoked by the user's 405 indication of a biometric authentication request. Upon being invoked, the roaming authentication application 410 may issue a request 430 for collection of a biometric sample.

In the illustrated embodiment, the request 430 for collection of a biometric sample is received by a biometric driver 415. In certain embodiments, the biometric driver 415 may be an application operating within the operating system of the IHS. For instance, the biometric driver 415 may be an integral, protected component of the operating system, such as the Windows Biometric Framework (WBF) included within WINDOWS operating systems. In other embodiments, the biometric driver 415 may operate within the secure execution environment provided by a secure processor that operates external to the operating system, such as secure processor 115 and 215 of FIGS. 1 and 2, respectively.

As illustrated, the biometric driver 415 may foreword request 435 for collection of a biometric sample from user 405. The request 435 may be received by an environment operated by the firmware 420 of a biometric sensor. As described with regard to FIGS. 1 and 2, biometric sensors may operate based on instructions executed by various types of logic units, such as microcontrollers and systems-on-chips. Based on such instructions, the biometric sensor firmware 420 may be configured to confirm that an encryption key is available for encoding the biometric print to be collected from user 405. As described, a user 405 may be associated with a key pair assigned to an organization with which the user 405 is affiliated. In certain embodiments, the biometric sensor firmware 420 may query a secure processor of the IHS in order to determine whether an encryption key is available for the biometric authentication protocol applicable to user 405. If no encryption key for user 405 can be identified by the biometric sensor firmware 420, a notification 445 of denied access may be provided to the user 405 via the roaming authentication application 410. In certain embodiments, the biometric sensor firmware 420 may be configured to deny all requests for a collection of a biometric print for which no encryption key can be identified for user 405, thus preventing the transmission of unprotected biometric prints.

If the biometric sensor firmware 420 identifies a suitable encryption key, either stored locally by a secured memory of the biometric sensor or a secured memory of a secure processor, a command 450 is dispatched to the biometric sensor 425 for collection of a biometric sample from user 405. In certain embodiments, the biometric sensor 425 may signal the user 405 to provide a biometric sample. For instance, in the illustrated embodiment, the user may respond to an LED or other indicator triggered by the biometric sensor firmware 420 by placing 455 a finger upon a fingerprint sensor. In certain embodiments, roaming application 410 may direct the user 405 in providing a biometric sample, such as instructing the user 405 regarding acceptable voice samples that may be spoken by the user 405, or instructing the user 405 in positioning their face relative to a camera of the IHS.

At 460, the biometric sensor 425 captures the biometric print and provides the print to the biometric sensor firmware 420. In various instances, the collected biometric print may be an image of a fingerprint or facial scan of the user 405, or the collected biometric print may be an audio file storing the voice sample provided by user 405 via a microphone sensor. As illustrated, the collected biometric print may be encrypted 465 by the operation of the biometric sensor firmware 420. As described with regard to FIG. 3, in certain embodiments, the biometric sensor firmware 420 may rely on an authentication system provided by a secure processor of the IHS in order to provide the encryption key corresponding to user 405 and, in certain instances, to perform the encryption of the collected biometric print.

Once the collected biometric print has been encrypted, the biometric sensor firmware 420 returns the encrypted biometric print 470 to the roaming authentication application 410 via the biometric driver 415. In certain embodiments, the roaming authentication application 410 may attempt to authenticate the collected biometric print itself through attempts to match the biometric print to biometric templates stored locally, such as within a secured storage of a secure processor of the IHS. In such instances, the roaming authentication application 410 may rely on the secure processor to decrypt the collected biometric print and to match the print against the locally-stored templates.

In other embodiments, the roaming authentication application 410 may rely on a remote authentication service for authentication of the user 405 based on the collected biometric print. In such embodiments, the remote authentication service may maintain the private key that is associated with the organization of user 405 and that correctly decrypts biometric samples provided by user 405. If the biometric print provided by user 405 matches a template, stored either locally or by the remote authentication service, the identity of the user 405 is authenticated. In such scenarios, the roaming authentication application 410 initiates logging in of user 405 based on the authenticated identity and the permissions associated with the private key used to decrypt the collected biometric sample of user 405.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for roaming biometric authentication of users requesting access to an Information Handling System (IHS) or a resource available via the IHS, the method comprising:
   receiving a request to collect a biometric print for authentication of a user of the IHS;
   retrieving, by a logic unit of a biometric sensor of the IHS, a biometric key associated with a group affiliation of the user, wherein the biometric key associated with the group affiliation of the user is retrieved from a secure storage of a secure processor of the IHS;
   upon retrieving the biometric key, collecting, by the biometric sensor of the IHS, the biometric print from the user;
   encrypting, by instructions executed by the logic unit of the biometric sensor, the collected biometric print using the biometric key associated with the group affiliation of the user, wherein the collected biometric print is encrypted by the biometric sensor without transmitting the collected biometric print to any other component of the IHS; and
   transmitting the biometric print encrypted by the logic unit of the biometric sensor to an authentication system for matching the biometric print against a library of stored biometric templates, wherein the authentication system operates within a secure execution environment of the secure processor, and wherein the authentication system attempts to match the biometric print against a library of locally stored biometric templates and wherein the authentication system transmits the encrypted biometric print to a remote authentication service when the biometric print cannot be matched locally.

2. The method of claim 1, further comprising signaling, based on the instructions executed by the logic unit of the biometric sensor, an indication that the biometric sensor is ready to collect the biometric print of the user.

3. The method of claim 2, wherein the indication signaled by the biometric sensor comprises illumination of an indicator light.

4. The method of claim 1, wherein the biometric sensor is coupled to the secure processor via an out-of-band signal pathway that is not accessible via the operating system of the IHS, and wherein the logic unit of the biometric sensor transmits the encrypted biometric print to the secure processor via the out-of-band signal pathway.

5. The method of claim 1, wherein instructions utilized by the logic unit of the biometric sensor comprise firmware instructions that are authenticated upon initialization of the biometric sensor.

6. The method of claim 5, wherein the firmware instructions of the biometric sensor are authenticated based on a reference signature for the firmware instructions generated during assembly of the IHS.

7. An Information Handling System (IHS) supporting roaming biometric authentication of users of the IHS resource available via the IHS, the IHS comprising:
   a biometric sensor comprising a logic unit and a secured memory, wherein the biometric sensor is operable for collecting biometric prints, and wherein the logic unit of the biometric sensor is configured to:
      receive a request for the biometric sensor to collect a biometric print for authentication of a user of the IHS;
      retrieve a biometric key associated with a group affiliation of the user, wherein the biometric key associated with the group affiliation of the user is retrieved from a secure storage of a secure processor of the IHS;
      upon the biometric sensor retrieving the biometric key, collect the biometric print from the user;
      encrypt the collected biometric print using the biometric key associated with the group affiliation of the user, wherein the collected biometric print is encrypted by the biometric sensor without transmitting the collected biometric print to any other component of the IHS; and
      transmit the encrypted biometric print to an authentication system; and
   the authentication system configured to:
      decrypt the biometric print received from the biometric sensor; and
      match the biometric print against a library of stored biometric templates, wherein the authentication system operates within a secure execution environment of the secure processor, and wherein the authentication system attempts to match the biometric print against a library of locally stored biometric templates and wherein the authentication system transmits the encrypted biometric print to a remote authentication service when the biometric print cannot be matched locally.

8. The IHS of claim 7, wherein the logic unit of the biometric sensor is further configured to signal an indication that the biometric sensor is ready to collect the biometric print of the user.

9. The IHS of claim 8, wherein the indication signaled by the biometric sensor comprises illumination of an indicator light.

10. The IHS of claim 8, wherein the biometric sensor is coupled to the secure processor via an out-of-band signal pathway that is not accessible via the operating system of the IHS, and wherein the logic unit of the biometric sensor transmits the encrypted biometric print to the secure processor via the out-of-band signal pathway.

11. The IHS of claim 7, wherein instructions utilized by the logic unit of biometric sensor comprise firmware instructions that are authenticated upon initialization of the biometric sensor based on a reference signature for the firmware instructions generated during assembly of IHS.

12. A system for roaming biometric authentication, the system comprising:
   a plurality of Information Handling Systems (IHSs) operable for providing biometric authentication of a plurality of users of the system, wherein each IHS comprises:
      a biometric sensor comprising a logic unit and a secured memory, wherein the biometric sensor is operable for collecting biometric prints, and wherein the logic unit of the biometric sensor is configured to:
         receive a request for the biometric sensor to collect a biometric print for authentication of a user;
         retrieve a biometric key associated with a group affiliation of the user, wherein the biometric key associated with the group affiliation of the user is retrieved from a secure storage of a secure processor of a respective IHS;
         upon the biometric sensor retrieving the biometric key, collect the biometric print from the user;
         encrypt the collected biometric print using the biometric key associated with the group affiliation of the user, wherein the collected biometric print is encrypted by the biometric sensor without transmitting the collected biometric print to any other component of the IHS; and
         transmit the encrypted biometric print to an authentication system; and
      a secure processor, wherein the authentication system operates within a secure execution environment of the secure processor and wherein the authentication system is configured to:
         decrypt the biometric print received from the biometric sensor; and
         match the biometric print against a library of stored biometric templates, wherein the authentication system attempts to match the biometric print against a library of locally stored biometric templates and wherein the authentication system transmits the encrypted biometric print to a remote authentication service when the biometric print cannot be matched locally.

13. The system of claim 12, wherein the logic unit of the biometric sensor is further configured to signal an indication that the biometric sensor is ready to collect the biometric print of the user.

14. The system of claim 13, wherein the indication signaled by the biometric sensor comprises illumination of an indicator light.

15. The system of claim 12, wherein the biometric key associated with the group affiliation of the user is retrieved from a secure storage of a secure processor of the IHS, and wherein the biometric sensor is coupled to the secure processor via an out-of-band signal pathway that is not accessible via the operating system of an IHS.

* * * * *